May 13, 1952  I. H. LEHMAN  2,596,568
GRAIN TREATING DEVICE
Filed Feb. 13, 1948  3 Sheets-Sheet 1

Inventor:
Irvin H. Lehman
By: Lee J. Gary
Attorney

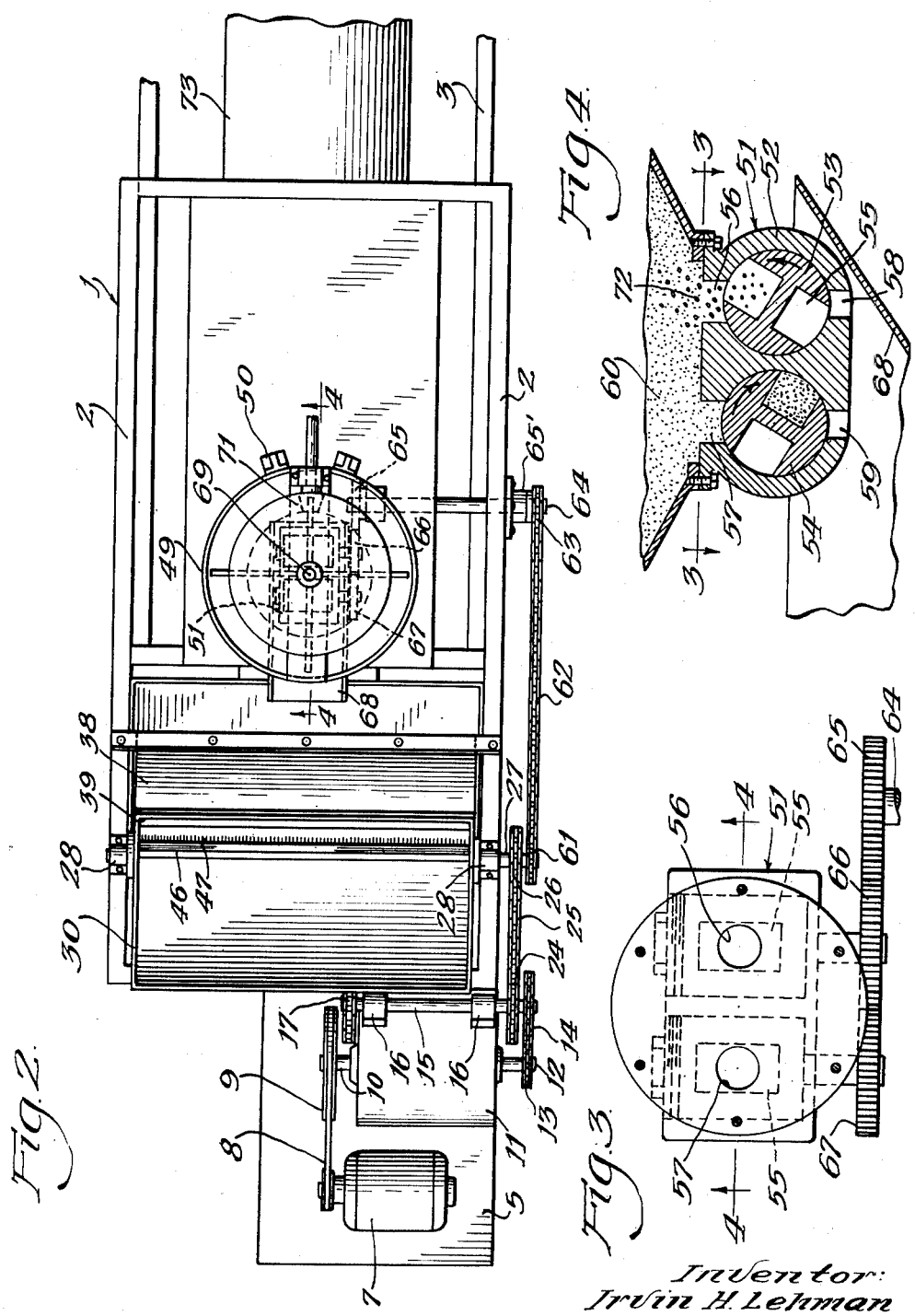

May 13, 1952      I. H. LEHMAN      2,596,568
GRAIN TREATING DEVICE
Filed Feb. 13, 1948      3 Sheets-Sheet 3
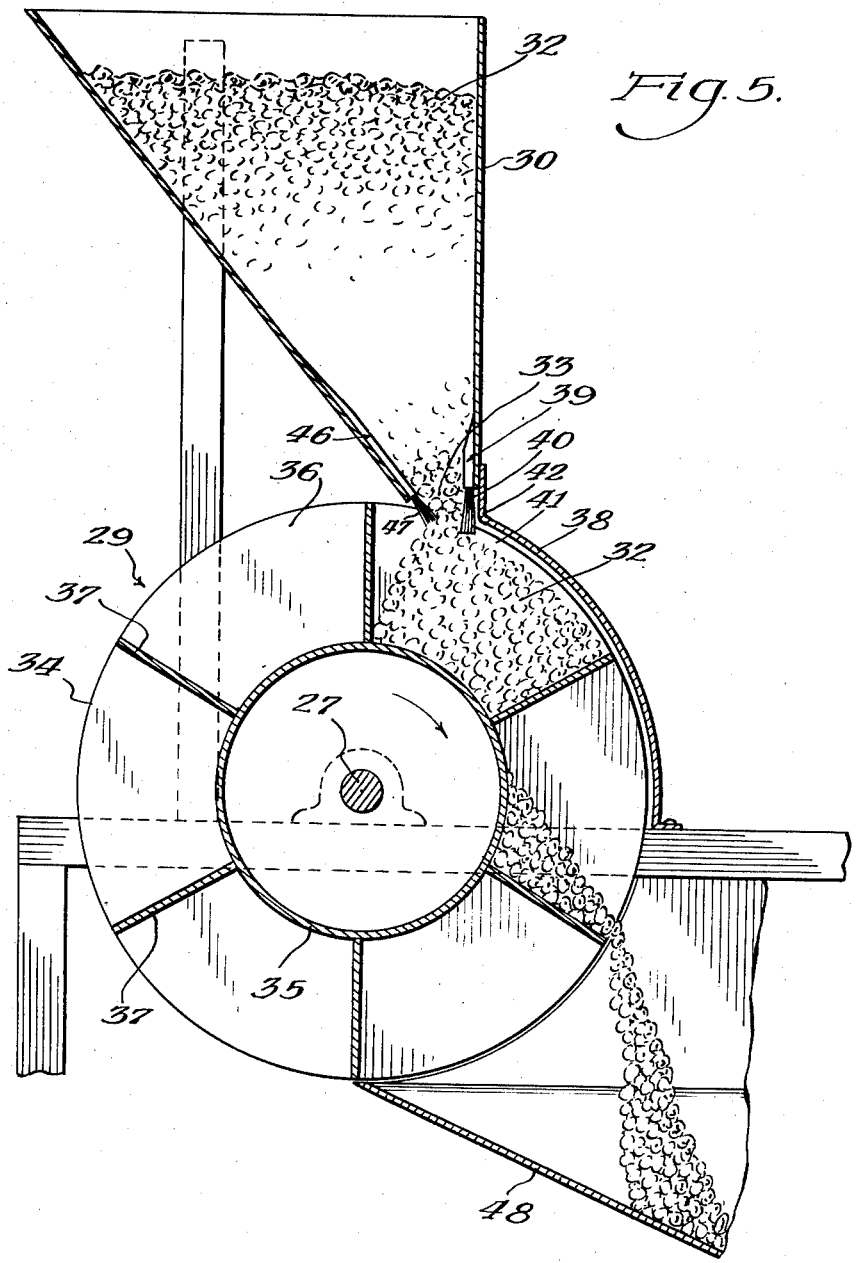
Inventor:
Irvin H. Lehman
By Lell J. Gary
Attorney Patented May 13, 1952

2,596,568

UNITED STATES PATENT OFFICE 2,596,568

GRAIN TREATING DEVICE

Irvin H. Lehman, Kentland, Ind.

Application February 13, 1948, Serial No. 8,260

7 Claims. (Cl. 222—352)

This invention relates to improvements in a device for proportioning discrete dry material and a liquid treatment therefor in a continuous fashion wherein to a predetermined mass of dry discrete material a predetermined increment of liquid is added for subsequent admixing.

One of the objects of the present invention resides in the provision of a machine wherein discrete dry material is measured into equal predetermined volumes by a rotary measuring device which functions in timed relationship with a rotary volume measuring device for liquid, the machine being so constructed as to continuously deliver predetermined volumes of the dry material with corresponding predetermined increments of liquid to a mixing chamber.

One of the important features of the present invention resides in the provision of means whereby the dry material is deposited into compartments of a rotary drum and is prevented from assuming a pile therein which may interfere with the rotation of the drum or injure the discrete particles comprising the dry material.

Another feature of the invention resides in means for charging the dry material to the compartmented drum and discharging the same from said compartments at phases of revolution of the drum such as to conserve operating power and accelerate the proportioning and delivering operation.

A further important feature of the invention resides in the provision of a rotary pocketed valve for delivering increments of liquid, the valve being so positioned with respect to the bulk supply of liquid as to periodically discharge air from the pockets of the valve into the liquid and thus cause an agitation in the bulk supply of liquid.

Other objects and advantages of my invention will be apparent from the accompanying drawing and following detailed description.

In the drawings,

Fig. 2 is a top plan view of the device illustrated in Fig. 1.

Fig. 3 is a sectional view taken on line 3—3 of Fig. 4.

Fig. 4 is a sectional view taken on line 4—4 of Fig. 3.

Fig. 5 is an enlarged detailed sectional view illustrating the relationship of the hopper and proportioning drum.

Figure 1:
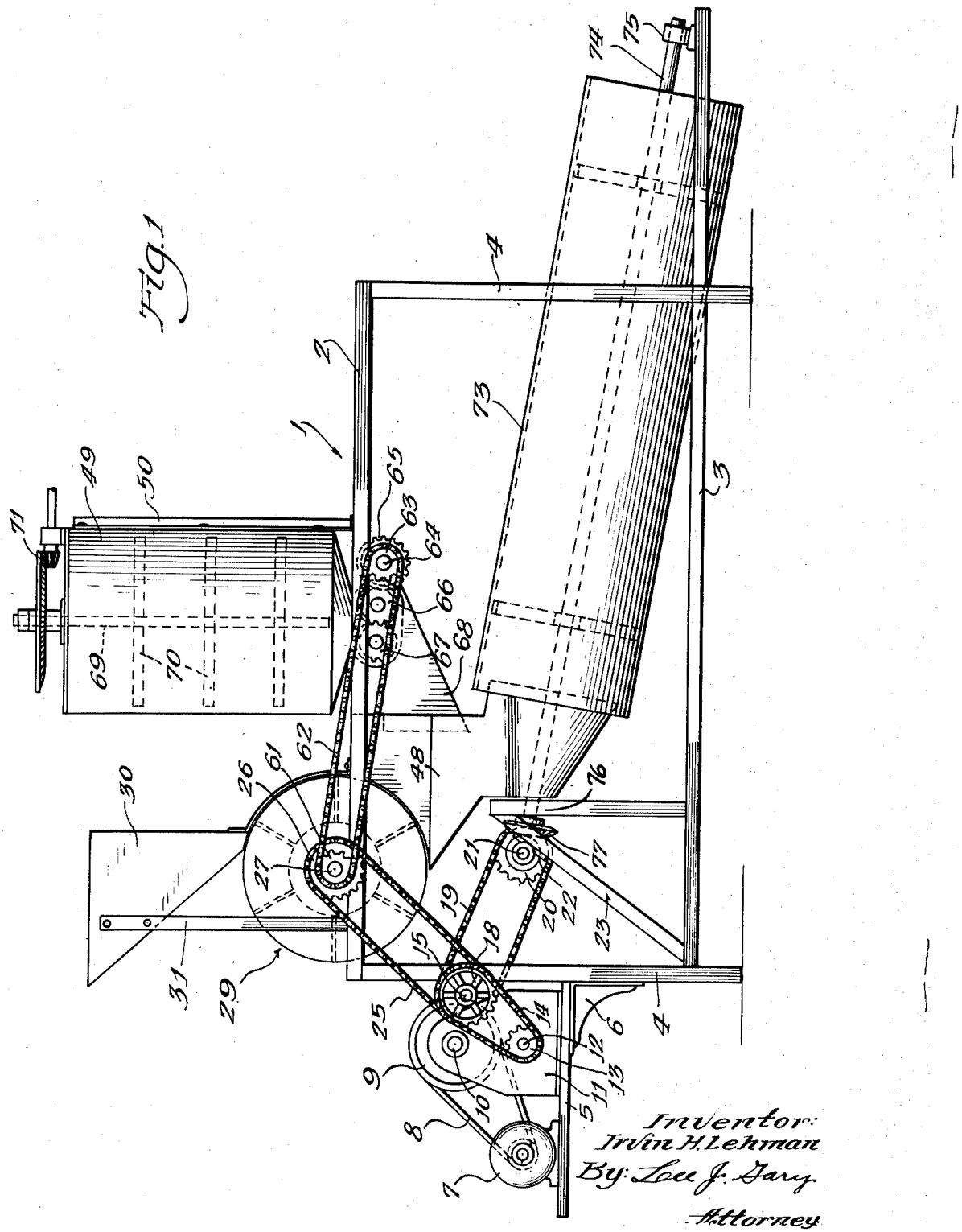
Fig. 1 is a side elevational view of a device embodying the concepts of my invention.

In the preparation of grains such as corn, oats, wheat, soya beans or other legume seeds, grass seeds, vegetable seeds, rice or the like for seeding purposes, the grains are treated with chemicals which function as preservatives therefor, and facilitate germination of the grains. In treating the grains with the chemicals which may comprise a liquid suspension of tetrachloroparabenzoquinone and a small amount of dichlorodiphenyl-trichloroethane (DDT) in a liquid carrier, proportioned quantities of the grain are mixed with proportioned quantities of the suspension. It is desirable for purposes of economy and efficiency in the treatment that predetermined amounts of grain and the liquid treatment be proportioned rather accurately. Such treatment, of course, involves a handling of the grain and it is well known that the more the grain is handled, the greater is the likelihood of injuring or breaking the grain.

My present invention contemplates a machine for proportioning predetermined quantities of grain and delivering said grain to a mixing chamber wherein the grain is mixed with predetermined portions of the liquid treatment, the invention being characterized in that the grain is handled with very little breakage.

Referring in detail to the drawings, 1 indicates a frame structure comprising top horizontal frame members 2, lower horizontal members 3 supported by legs 4. A platform 5 is carried by one set of the legs 4 and is supported by a bracket 6. An electric motor 7 is mounted upon platform 5 and is adapted to drive by means of sprocket chain 8, a sprocket wheel 9 mounted upon a shaft 10 which constitutes the driven shaft of a conventional speed reducer 11. A shaft 12, constituting the drive shaft of the speed reducer and which is rotated at a relatively slow speed, carries sprocket wheel 13 over which sprocket chain 14 is trained.

A shaft 15 is journalled in bearings 16 which, in turn, are carried upon the legs 4 of the frame 1. A sprocket wheel 17 is mounted upon one end of shaft 15 and sprocket wheel 18 is mounted upon the other end thereof, the chain 14 being trained around sprocket wheel 18 and functioning to drive shaft 15. A sprocket chain 19 is trained around sprocket wheel 17 and in turn drives sprocket wheel 20 carried upon shaft 21. The shaft 21 is journalled in bearings 22 which are carried by structural members 23 mounted upon the lower horizontal frame members 3. As will be hereinafter more fully described, shaft 21 functions to drive the mixing device.

A sprocket wheel 24 is mounted upon an intermediate portion of shaft 15 and sprocket chain 25 is trained around sprocket wheel 24 and, in turn, is trained around and drives sprocket wheel 26, mounted upon shaft 27.

Shaft 27 is journalled in bearings 28 which are carried upon the opposite upper horizontal frame members 2. Shaft 27 intermediate its length supports a proportioning or measuring drum 29, which, as will be hereinafter more fully described, is adapted to continuously proportion predetermined volumes of grain to be treated.

A hopper 30 is positioned above drum 29 and is supported upon standards 31, which, in turn, are mounted upon the upper horizontal frame members 2. Hopper 30 is adapted to carry a bulk supply of grain 32, the grain being introduced into the hopper through its open top by means of a conduit or other delivery mechanism (not shown). The hopper 30 is of substantially triangular cross section and is provided at its lower end with a restricted opening 33 through which grain 32 carried in said hopper is continuously discharged.

Drum 29 comprises two circular end plates 34 which are carried upon the ends of a cylindrical member 35 comprising the core of the drum. The annular space between the outer surface of the core 35 and the outer edges of the circular end plates 34, is divided into a plurality of segments or compartments 36 by means of radially extending partitions 37, the partitions being so spaced as to provide a plurality of compartments 36 of equal volumes.

The restricted discharge opening 33 of the hopper 30 is positioned in an offset relationship with respect to the vertical central plane of the drum 29, the discharge opening being on the side of said central plane in the direction in which the drum is adapted to rotate.

Referring particularly to Fig. 5, it will be noted that drum 29 is adapted to rotate in a clockwise direction and, hence, the discharge opening 33 is positioned to the right of the central vertical plane of said drum, that is, the plane which passes through the axis of shaft 27. The purpose of discharging the grain into the compartments 36 at this point is to take advantage of the weight of the grain to assist in the rotation of the drum. Consequently, the power necessary to rotate the drum is reduced to a minimum. In addition, discharging the grain into the compartments at this phase of their rotation necessitates a minimum closure for the compartments.

As can readily be seen in Fig. 5, an arcuate closure plate 38 defines the path of travel of the outer edges of the partitions 37 throughout an angle of less than 90° of travel of the drum. As one of the important features of my invention, a flexible scraper member 39 is positioned at the discharge opening 33 of hopper 30.

The member 39 may comprise an elongated brush having bristles 40 which extend within the outer portion of the compartments 36, that is, the ends of the bristles extend beneath the outer edges of the partitions 37 and beneath the defining edges of the end plates 34. The member 39 is positioned at that portion of the hopper so as to have the bristles 40 contact the grain within the compartment 36 which is being loaded from the hopper and the bristles 40 are positioned adjacent the point of travel of the drum immediately in advance of the closure plate 38. In this manner the upper portion of the grain 32 carried in the compartment 36 which is being loaded is depressed, as shown best at 41 in Fig. 5, whereby a space is provided between the upper surface of the mass of grain 32 and the closure plate 38.

Of course, the grain 32 being in a dry state, is mobile and as the drum rotates, the depressed level 41 is not preserved since the grain moves by gravity toward the inner face of the closure 38 as rotation of the drum proceeds. However, by the appropriate location of the brush 40, the grain carried within the compartment 36 being loaded is prevented from becoming jammed at the edge 42 of the juncture between the closure plate 38 and the hopper. Consequently, substantially no damage to the grain results from the proportioning operation.

If desired a member 46 may be positioned upon the opposite wall of the hopper, said member carrying a bristled edge 47 which extends the length of the compartment similar to the brush 40. The presence of the relatively flexible defining edges of the hopper formed by the bristles 40 and 47 is to provide a flexible expandible opening for the hopper whereby the grain moves into the compartment being loaded in a more or less gentle manner. In addition, by the provision of the brush member 47, the grain is prevented from bouncing out of the compartment being filled and causing jamming of the grain between the partition 37 which is approaching the hopper. If desired, however, the member 46 may be eliminated.

Although my invention has been shown as employing a brush member 40 for depressing the level of the grain, it is to be understood that other flexible elements may be employed. For instance, the brush 40 may be replaced by a rubber strip which extends a sufficient distance into the compartments so as to depress the level of the grain in the compartment being loaded in the same manner as has been described in conjunction with the brush 40.

As the drum 29 continues its rotation, the loaded compartment passes away from the lower edge of the closure 38 and, hence, the compartment being unclosed, the grain flows by gravity from the compartment and is discharged into a hopper 48.

A tank 49 is positioned upon the upper horizontal frame members 2 and is supported thereon by angle irons 50. At the lower end of the tank a valve assembly 51 is mounted. The valve assembly 51 comprises a casing 52 within which a pair of rotatable barrels 53 and 54 are positioned. Each of the barrels 53 and 54 are provided with a pair of pockets 55. The casing is provided with a pair of inlets 56 and 57, and a pair of outlets 58 and 59. The tank 49 is adapted to carry a bulk supply of treating material 60, and as will be hereinafter more fully described, said material is discharged from said tank by the rotation of the barrels 53 and 54.

A sprocket wheel 61 is mounted upon shaft 27 and functions to drive a sprocket chain 62. The sprocket chain 62 is trained around a sprocket wheel 63 mounted upon an end of shaft 64 which is journalled in bearing 65' carried upon the upper horizontal frame member 2. The opposite end of shaft 64 carries a spur gear 65 which, in turn, meshes with a spur gear 66. Spur gear 66 is rigidly connected to barrel 53 and said spur gear meshes with an adjacent spur gear 67 which is rigidly connected to barrel 54. Hence, when drum 29 is rotated, gear 65 is also rotated and by means of the gears 66 and 67 the barrels 53 and 54 are rotated in timed relationship with the rotation of drum 29.

It can readily be seen that as barrels 53 and 54 rotate, pockets 55 carried by said barrels periodically move into registry with the openings 56 and 57, and are consequently filled with treating material 60 from the tank 49. As the barrels rotate the filled pockets come into registry with the discharge openings 58 and 59 and, hence, said pockets empty the treating material through said discharge openings into a trough 68 which connects with hopper 48. The pockets 55 are so proportioned as to volume as to carry an appropriate amount of treating material sufficient to treat that volume of grain which is carried in one of the compartments 36. The arrangement is such that as each compartment 36 discharges its load of grain into the hopper 48, one of the pockets 55 of either barrel 53 or barrel 54, discharges its contents into the trough 68, thereby mixing a predetermined volume of treating material with a predetermined volume of grain.

One of the important features of my invention is involved in the manner in which the treating liquid is handled. The treating material ordinarily employed for the treatment of grain comprises a suspension of solid material in a liquid vehicle. It is, of course, important that the solid suspended matter be uniformly distributed throughout the liquid carrier. There is a tendency for such solid matter to settle and, consequently, there is a tendency to discharge non-uniform concentrations of the treating material. Of course, a stirring mechanism comprising a shaft 69 carrying a plurality of paddles 70, may be employed to generally agitate the bulk supply of treating liquid 60 within the tank, the shaft 69 being driven by an appropriate arrangement of bevel gears 71, which, in turn, may be driven from a suitable source of power (not shown).

However, the greatest tendency for settling of the solid material occurs adjacent the discharge openings 56 and 57 and unless the shaft 69 is rotated at relatively high speed in order to vigorously agitate the treating liquid 60, settling will occur adjacent said discharge openings. As a feature of my invention, however, it will be noted that as each pocket 55 moves away from the respective discharge opening 58 or 59, it contains air. After said pocket moves into registration with the openings 56 and 57, the air is released from said pocket and a plurality of bubbles 72 are formed which move vigorously through the openings 56 and 57 and into the bottom portion of the tank 49. The release of such bubbles agitates the liquid adjacent the openings 56 and 57 and, consequently, tends to maintain that local portion of the treating liquid adjacent the openings in a substantially homogeneous state. Consequently, when the pocket fills with liquid a substantially uniform dispersion of the solid material and the liquid is assured.

Hopper 48 into which the grain and liquid is discharged from the proportioning devices, connects into an inclined mixing chamber 73. The chamber 73 is carried upon an inclined shaft 74 which is journalled in bearings 75 and 76. A bevel gear (not shown) is mounted upon shaft 21 and is adapted to mesh with bevel gear 77 carried at the end of the inclined shaft 74. Rotation of shaft 21 in timed relationship with the remaining portions of the machine causes shaft 74 to be rotated and, hence, the increments of grain and liquid periodically discharged into the drum 73 to be intimately mixed in said drum, the treated grain moving downwardly within the inclined drum and being discharged at the lower end thereof into any suitable receptacle (not shown).

Although my invention is shown and described as comprising a valve structure 51 having two barrels 53 and 54, each being provided with two pockets 55, it is to be understood that a valve structure having one or more rotating barrels may be employed, the rate of rotation of the barrel or barrels being correlated with the number and radial relationship of the pockets. For example, if a single barrel valve were employed, the barrel would be provided with four pockets disposed at an angle of 90° with respect to each other. Of course, if such a barrel were employed it would be rotated at half the angular speed contemplated for the rotation of the valve 53 and 54 in order that a pocket full of liquid treatment would be discharged for each increment of discrete material discharged from the drum 29.

As another modification of my invention, the closure plate 38 instead of being constructed of steel or other rigid material may be constructed of rubber or other more or less pliable material. Or, if desired, the partitions 37 instead of being constructed of a rigid material may be constructed of a relatively flexible material such as rubber. It may be found that if either the plate 38 is constructed of rubber, or the partitions 37 are constructed of rubber, or if both of these members are constructed of rubber or other flexible material, the brush or depressing element 39 may be eliminated, since grain or other discrete material which may be entrapped between an onwardly moving partition 37 and the forward edge of the plate 38, would not be cracked or broken, or would not tend to jam the machine since either the plate 38 or partition 37 or both may "give" sufficiently so as to permit dislodgement of the discrete particle.

These and other obvious modifications will be suggested to those skilled in the art by my invention and, hence, I do not wish to be limited except as necessitated by the prior art.

I claim as my invention:

1. A machine for proportioning and delivering in a continuous manner substantially equal volumes of discrete material which comprises a hopper for a bulk supply of discrete material, said hopper being provided with a discharge opening, a drum rotatable about a substantially horizontal axis beneath said hopper, a plurality of radial partitions carried by said drum to divide said drum into a plurality of compartments of substantially equal volume for the reception of discrete material from the discharge opening of said hopper, the circumferential dimension of said hopper opening relative to said drum being less than the distance between adjacent radial partitions upon said drum, means for rotating said drum to carry discrete material in said compartments from said hopper to the lower portion of said drum whereat said discrete material discharges from said compartments by gravity, a stationary arcuate member disposed adjacent the path of travel of the periphery of said drum between said hopper and the discharge point of said compartments, said member serving as a closure for the compartments carrying discrete material, and means disposed adjacent the discharge of said hopper for depressing the level of said discrete material within a compartment to a level between the outermost edges of the radial partitions defining said compartment and the surface of the drum prior to the passage of said partitions beneath said arcuate member.

2. A machine for proportioning and delivering in a continuous manner substantially equal volumes of discrete material which comprises a hopper for a bulk supply of discrete material, said hopper being provided with a discharge opening, a drum rotatable about a substantially horizontal axis beneath said hopper, a plurality of radial partitions carried by said drum to divide said drum into a plurality of separate compartments of substantially equal volume for the reception of discrete material from the discharge opening of said hopper, said discharge opening having its length substantially parallel to the length of said drum, the width of said opening being less than the distance between adjacent partitions on said drum, means for rotating said drum to carry discrete material in said compartments from said hopper to the lower portion of said drum whereat said discrete material discharges from said compartments by gravity, a stationary arcuate member disposed adjacent the path of travel of the periphery of said drum between said hopper and the discharge point of said compartments, said member serving as a closure for the compartments carrying discrete material, and resilient means disposed adjacent the discharge of said hopper for depressing the level of said discrete material in a predetermined compartment below the outermost edges of said radial partitions defining said compartment and above the surface of the drum prior to the passage of said partitions beneath said arcuate member.

3. A machine for proportioning and delivering in a continuous manner substantially equal volumes of discrete material which comprises a hopper for a bulk supply of discrete material, said hopper being provided with a discharge opening, a drum rotatable about a substantially horizontal axis beneath said hopper, a plurality of radial partitions carried by said drum to divide said drum into a plurality of separate compartments of substantially equal volume for the reception of discrete material from the discharge opening of said hopper, said discharge opening having its length substantially parallel to the length of said drum, the width of said opening being less than the distance between adjacent partitions on said drum, said opening being disposed offset laterally upon the downwardly moving side of the drum from the axis of said drum, means for rotating said drum to carry discrete material in said compartments from said hopper to the lower portion of said drum whereat said discrete material discharges from said compartments by gravity, a stationary arcuate member disposed adjacent the path of travel of the periphery of said drum between said hopper and the discharge point of said compartments, said member serving as a closure for the compartments carrying discrete material, and a brush disposed adjacent the discharge of said hopper the end of said brush extending into said compartment below the outermost edges of said radial partition for depressing the level of said discrete material in said compartment below the outermost edges of the partitions prior to their passage beneath said arcuate member.

4. A machine for proportioning and delivering in a continuous manner substantially equal volumes of discrete material which comprises a hopper for a bulk supply of discrete material, said hopper being provided with a discharge opening, a drum rotatable about substantially horizontal axis beneath said hopper, said axis being laterally offset with respect to said discharge opening so as to dispose said opening above only the downwardly moving side of said drum, a plurality of radial partitions carried by said drum to divide said drum into a plurality of separate compartments of substantially equal volume for the reception of discrete material from said hopper, means for rotating said drum to carry discrete material in said compartments from said hopper to a lower portion of said drum, a stationary arcuate member disposed adjacent the path of travel of the periphery of said drum between the hopper and a point short of the lowermost portion of the drum's travel, said member serving as a closure for the compartments carrying discrete material, the discrete material in compartments below the lower end of said arcuate member being unconfined and being discharged from said compartments by gravity the outer portions of said radial partitions being constructed of a resilient material whereby grinding of said discrete material between the outer edges of said partitions and the arcuate member is prevented.

5. A machine for proportioning and delivering in a continuous manner substantially equal volumes of discrete material which comprises a hopper for a bulk supply of discrete material, said hopper being provided with a discharge opening, a drum rotatable about substantially horizontal axis beneath said hopper, said axis being laterally offset with respect to said discharge opening so as to dispose said opening above only the downwardly moving side of said drum, a plurality of radial partitions carried by said drum to divide said drum into a plurality of compartments of substantially equal volume for the reception of discrete material from said hopper, said opening in said hopper being disposed with its length parallel to the axis of the drum and its width being lesser than the circumferential distance between adjacent partitions, means for rotating said drum to carry discrete material in said compartments from said hopper to the lower portions of said drum above the lowermost portion of travel of the drum whereat said discrete material discharged from said compartments by gravity, a stationary arcuate member disposed adjacent the path of travel of the periphery of said drum between the hopper and the discharge point of said compartments, said member serving as a closure for the compartments carrying discrete material, the outer portions of said radial partitions and the arcuate member being constructed of resilient material whereby grinding of said discrete material between said partitions and said arcuate member is prevented.

6. A machine for proportioning and delivering in a continuous manner substantially equal volumes of grain which comprises a hopper for a bulk supply of grain, said hopper being provided with a discharge opening, a drum rotatable about a substantially horizontal axis beneath said hopper, a plurality of radial partitions carried by said drum to divide said drum into a plurality of compartments of substantially equal volume for the reception of grain from the opening in said hopper, the opening in said hopper being laterally offset on the downwardly moving side of said drum from the axis of said drum, means for rotating said drum to carry grain in said compartments from said hopper to the lower portion of said drum above the lowermost portion of the drum's travel whereat said grain discharges from said compartments by gravity, a stationary arcuate member disposed adjacent the path of travel of the periphery of said drum between said hopper and the discharge point of said compartments, said member serving as a closure for the compartments carrying grain, and means disposed adjacent the discharge of said hopper for depressing the level of said grain in said compartments below the outermost edges of said radial partitions and above the surface of said drum prior to the passage of said partitions beneath said arcuate member.

7. A machine for proportioning and delivering in a continuous manner substantially equal volumes of discrete material which comprises a hopper for a bulk supply of discrete material, said hopper being provided with a discharge opening, a drum rotatable about a substantially horizontal axis beneath said hopper, said axis being laterally offset with respect to said discharge opening so as to dispose said opening above the downwardly moving side of said drum, a plurality of radial partitions carried by said drum to divide said drum into a plurality of separate compartments of substantially equal volume for the reception of discrete material from said hopper, said opening in said hopper being disposed with its length parallel to the axis of the drum and its width being a minor percentage of the circumferential difference between adjacent partitions, means for rotating said drum to carry discrete material in said compartments from said hopper to the lower portion of said drum above the lowermost portion of travel of the drum whereat said discrete material is discharged from said compartments by gravity, a stationary arcuate member disposed adjacent the path of travel of the periphery of said drum between the hopper and the discharge point of said compartments, said member serving as a closure for the compartments carrying discrete material in their travel from the hopper to the point of discharge, said arcuate member being constructed of a resilient material whereby grinding of said discrete material between the outer edges of said partitions and the arcuate member is prevented.

IRVIN H. LEHMAN.

REFERENCES CITED

The following references are of record in the file of this patent:

UNITED STATES PATENTS

| Number | Name | Date |
| --- | --- | --- |
| 331,242 | Hyatt | Nov. 24, 1885 |
| 740,699 | Schrader | Oct. 6, 1903 |
| 930,086 | Reed | Aug. 3, 1909 |
| 1,022,774 | De Julio | Apr. 9, 1912 |
| 1,330,179 | Edtbauer | Feb. 10, 1920 |
| 2,161,553 | Westbery et al. | June 6, 1939 |
| 2,205,324 | Venable | June 18, 1940 |
| 2,304,753 | Seidenstricker | Dec. 8, 1942 |